United States Patent [19]
Fujita et al.

[11] Patent Number: 4,877,713
[45] Date of Patent: Oct. 31, 1989

[54] PREFORMATTED OPTICAL RECORDING CARD AND METHOD OF PRODUCING THE SAME

[75] Inventors: Minoru Fujita; Yoichi Fukushima, both of Tokyo, Japan

[73] Assignee: Kyodo Printing Co., Ltd., Tokyo, Japan

[21] Appl. No.: 4,119

[22] Filed: Jan. 16, 1987

[30] Foreign Application Priority Data

Jan. 21, 1986 [JP] Japan ................... 61-10911

[51] Int. Cl.$^4$ ........................... G03C 3/00; G11B 7/00
[52] U.S. Cl. .................................... 430/270; 430/321;
430/322; 430/323; 430/324; 430/495; 428/201;
428/203; 428/913; 346/135.1; 369/272;
369/275; 369/277; 369/283; 369/284; 369/286
[58] Field of Search ............... 430/321, 322, 323, 324,
430/329, 331, 12, 16, 15, 945, 11, 9, 14, 40, 270,
495; 428/195, 913, 201, 203, 204; 346/135.1, 76
R; 369/277, 284, 272, 283, 286, 275

[56] References Cited

U.S. PATENT DOCUMENTS

| | | | |
|---|---|---|---|
| 3,687,664 | 8/1972 | Broadbent | 430/396 |
| 4,252,889 | 2/1981 | Tinet et al. | 430/321 |
| 4,288,510 | 9/1981 | Tinet et al. | 430/321 |
| 4,332,879 | 6/1982 | Pastor et al. | 430/321 |
| 4,359,519 | 11/1982 | Kraus et al. | 430/323 |
| 4,423,137 | 12/1983 | Rester | 430/321 |
| 4,492,750 | 1/1985 | Law et al. | 430/270 |
| 4,544,443 | 10/1985 | Ohta et al. | 427/131 |
| 4,584,259 | 4/1986 | Mayer et al. | 430/273 |
| 4,673,626 | 6/1987 | Takeda et al. | 430/15 |
| 4,719,613 | 1/1988 | Hirose et al. | 369/109 |
| 4,735,878 | 4/1988 | Hamersley et al. | 430/324 |
| 4,778,747 | 10/1988 | Ohta et al. | 430/321 |

FOREIGN PATENT DOCUMENTS 0021095 1/1981 France ................... 430/321
102795 9/1983 Japan .

Primary Examiner—Jose G. Dees
Assistant Examiner—Donald J. Loney
Attorney, Agent, or Firm—Martin A. Farber

[57] ABSTRACT

An improved art of producing an optical recording medium by utilizing a photo-etching technique is disclosed. Pits pattern of address for guide groove and sector on each of tracks of optical recording medium to be preformatted is formed in accordance with a photo-etching process or a resist lift-off process. A film of optical recording medium is formed on a transparent base plate and it is then subjected to photo-etching process or alternatively to resist lift-off process to form preformatted pits pattern.

5 Claims, 3 Drawing Sheets

PREFORMATTED OPTICAL RECORDING CARD AND METHOD OF PRODUCING THE SAME

BACKGROUND OF THE INVENTION

1. Field of the Invention

The present invention relates to an optical recording card and a method of producing the same. More particularly, it relates to preformatting pits in the optical recording medium of the optical recording card.

In recent years a number of cards in which various kinds of informations are recorded are increasingly put in practical use.

2. Description of the Prior Art

This kind of card is required to record various kinds of informations such as data concerning individual person, data concerning a company from which the card is issued or the like data. In the earlier age such informations were recorded using visual characters and symbols and in the later age they were recorded in response to electrical signals which were generated magnetically. However, the conventional card is required to take adequate measures for preventing data from being falsified and moreover for the current tendency of increased volume of informations.

In view of the current situation as mentioned above an optical recording card to which laser technology is applied to record information has been developed in recent years. The optical card includes an information recording medium (optical recording medium) with an optical reflective surface incorporated therein and it is used in such a manner that data pits are detected with the aid of a laser in dependency on the difference in optical reflection among the data pits to read information therefrom.

The optical recording medium is required to include a plurality of preformatting pits each of which represents an address by means of which the position and the state of usage of track guide grooves and each sector on each of tracks for carrying out tracking during the steps of writing, reading and erasing are shown and the preformatting pits are previously written in the optical recording medium in such a manner that they can not be erased in any way.

A so-called stamping method is hitherto employed for the purpose of forming the preformatting pits as mentioned above.

To facilitate understanding of the present invention it will be helpful that the conventional stamping method as disclosed in U.S. Pat. Nos. 4,301,099 and 4,395,211 will be described below with reference to FIG. 9.

When a plurality of ruggednesses serving as preformatting pit are formed on the optical recording medium, an assembly comprising a transparent base plate 21 made of glass or the like material and a layer of resist 22 deposited on the base plate 21 is subjected to exposing to laser light and thereby a pattern corresponding to arrangement of a plurality of preformatting pits 23 is formed. Thereafter, a master is obtained by plating a nickle film 24 on the thus formed pattern and a die 25 is produced with the aid of a mother stamper which is prepared by utilizing the thus obtained master. Next, by operating the die 25, the preformatting pits 23 are reproduced on a transparent plastic material 26 such as polycarbonate resin, acrylate resin or the like material in accordance with an injection molding process or the like and an aluminum reflective film 27 is placed on the recording surface whereby a required recording medium 20 is produced.

As will be readily apparent from the above description, the conventional steps of producing the recording medium are very complicated and it takes long time until the die is produced, causing a large amount of expenditure to be required for production of the recording medium. Accordingly, it may be concluded that the conventional method is not acceptable in the case of production within a short period of time and production order in the type of multi-kind and small production lot.

Particularly, due to the fact that a plurality of ruggednesses constituting preformatting pits are utilized for carrying out optical reflection, it is necessary that they are formed at a very high accuracy. Accordingly, a considerably large amount of labor is required to control a film thickness of the resist layer, resulting in production in small lots and production of the optical recording medium and the optical recording card at an inexpensive cost being achieved only with much difficulties.

SUMMARY OF THE INVENTION

Hence, the present invention has been made with the foregoing background in mind and its object resides in providing an optical recording card and a method of producing the same which assures that the optical reflective surface functioning as preformatting pit can be formed within a short period of time.

Other object of the present invention is to provide an optical recording card and a method of producing the same which assure that production is achieved at an inexpensive cost on a mass production line.

To accomplish the above objects there is proposed according to one aspect of the present invention a preformatted optical recording card which is charaterized in that an optical reflective film having a pattern corresponding to arrangement of a plurality of preformatting pits is formed on the inside surface of the transparent front base plate wherein the preformatting pits are formed in accordance with a photo-etching process.

Further, there is proposed according to other aspect of the present invention a method of producing a preformatted optical recording card which is characterized in that the method is carried out by way of the steps of forming an optical reflective film on the inside surface of a transparent base plate, forming a layer of resist on the optical reflective film, allowing the layer of resist to be subjected to exposure to a light beam which passes through a mask having a pattern corresponding to an arrangement of a plurality of preformatting pits, developing the layer of resist to produce a plurality of holes on the film by etching in accordance with the pattern corresponding to the arrangement of the preformatting pits, and removing the residual resist.

Further, there is proposed according to another aspect of the present invention a method of producing a preformatted optical recording card which is characterized in that the method is carried out by way of the steps of forming a layer of resist on the inside surface of the transparent front base plate, allowing the layer of resist to be subjected to exposure to a light beam which passes through a mask having a pattern corresponding to the arrangement of the preformatting pits, developing the layer of resist to produce a plurality of holes by etching in accordance with the pattern corresponding to the arrangement of the preformating pits, forming an optical reflective film on the layer of resist, and removing the residual resist in accordance with a resist lift-off process.

Other objects, features and advantages of the invention will become more clearly apparent from reading of the following accompanying drawings.

BRIEF DESCRIPTION OF THE DRAWINGS

The accompanying drawings will be briefly described below.

DESCRIPTION OF THE PREFERRED EMBODIMENTS

Now, the present invention will be described in a greater detail hereunder with reference to the accompanying drawings which illustrate preferred embodiments thereof.

Figure 1:
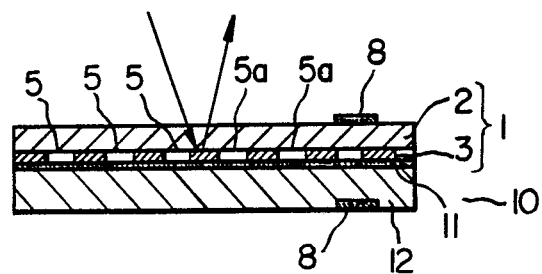
FIG. 1 is an enlarged schematic sectional view of an optical recording card.
Figure 2:
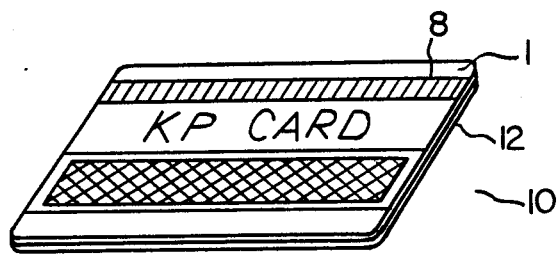
FIG. 2 is a perspective view of the optical recording card in FIG. 1.
Figure 3:
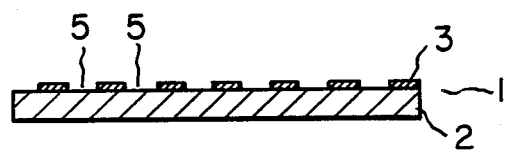
FIG. 3 is an enlarged sectional view illustrating such a state that an optical reflective film having a pattern corresponding to arrangement of a plurality of preformatting pits is formed on a front base plate.
Figure 4:
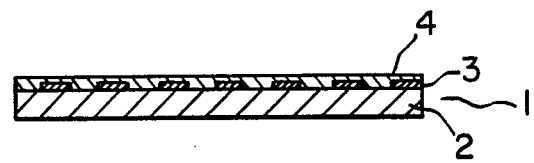
FIG. 4 is an enlarged schematic sectional view of an optical recording medium.

In FIGS. 1 and 2 reference numeral 10 designates an optical recording card. The optical card 10 is so constructed that an optical recording medium 1 is adhesively secured to a rear base plate 12 of the optical recording card 10 with the aid of a layer of adhesive 11 which is interposed therebetween and magnetic tapes 8 are fixedly placed on both the surfaces of the thus constructed optical recording card 10 using an adhesive. The optical recording medium 1 is formed with a plurality of preformatting pits 5 and a plurality of data pits 5a. As mentioned above, the present invention consists in a technology which is related to the preformatting pits 5. As shown in FIG. 3, the optical recording medium 1 is produced in such a manner that an optical reflective film 3 having a pattern corresponding to arrangement of the preformatting pits 5 is built on the inside surface of a front base plate 2. The thin film 3 is constituted by an optical film or optical recording film. As required, an optical recording film 4 may be built on the optical reflective film 3, as shown in FIG. 4.

Material having an excellent light permeability such as polycarbonate resin, acrylic resin, glass or the like is employed for the front base plate 2. The optical reflective film 3 is built on the inside surface of the front base plate 2 while it is formed with a plurality of hole-shaped preformatting pits 5. Accordingly, the inside surface of the front base plate 2 is exposed to the outside at the position where the preformatting pits 5 are located. But it should be noted that in the case where the optical recording film 4 is placed on the optical reflective film 3 as shown in FIG. 4, the exposed parts of the inside surface of the front base plate 2 are covered with the optical recording film 4. The optical reflective film 3 is constituted by material of which its light reflectivity is different from that of the optical recording film 4. On the other hand, the optical recording film 4 is constituted by optical recording material such as Te, In, Bi, TeOx, WO$_3$, In$_2$O$_3$, As$_2$O$_3$, MoO$_3$, TeAs, CS$_2$-Te, Te-C, As-Se-S-Ge, polymer with coloring agent contained therein, mixture of silver and polymer, magetoptical recording material or the like. In this specification the optical film is referred to as a reflective film 3 which is capable of reflecting light. For instance, Al, Cu, Ag, Ni, Cr, Zn, Sn or the like can be employed for the optical reflective film.

The preformatting pits 5 on the optical reflective film 3 are formed by transference from a mask or photographic film which has a pattern corresponding to the arrangement of the preformatting pits 5. The transference is achieved in accordance with an etching process. Further, near infrared light such as semiconductor laser light or the like and visual light, such as white light, tungsten light or the like can be preferably employed as reading light.

Figure 5:
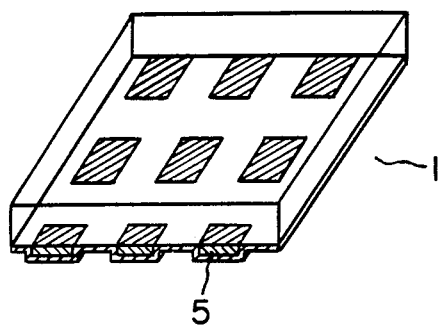
FIG. 5 is a schematic perspective view of the optical recording medium.
Figure 6:
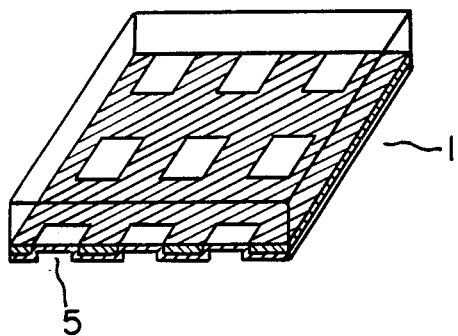
FIG. 6 is another schematic perspective view of the optical recording medium.

The preformatting pits 5 in the optical recording medium 1 may be built in the form of bright portion as shown in FIG. 5. Alternatively, they may be built in the form of dark portion as shown in FIG. 6.

Next, description will be made below with reference to FIG. 7 as to a method of producing the optical recording medium as constructed in the above-described manner.

Figure 7:
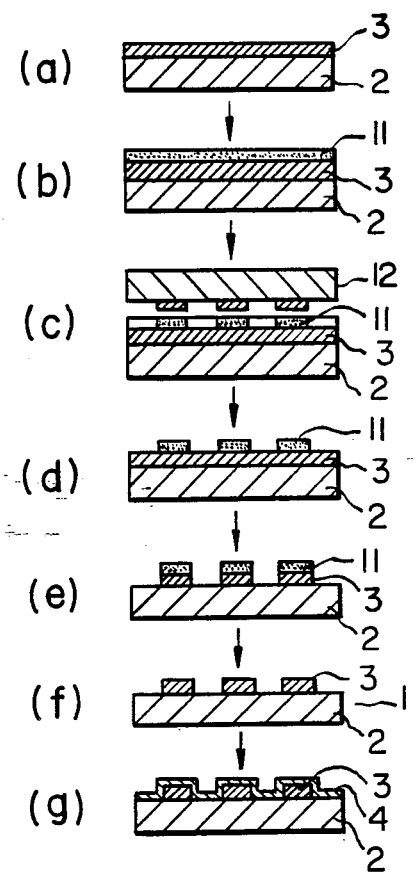
FIG. 7 is an illustrative view showing the steps of producing an optical recording medium.

FIG. 7 illustrates an embodiment of the method which is practiced in accordance with an etching process. First, an optical reflective film 3 constituted by material having high light reflectivity such as Al or the like is formed on the inside surface of the front base plate 2 of the optical recording card 10 by vacuum depositing (see FIG. 7(a)) and a layer of resist 11 is then placed on the optical reflective film 3 by spin coating (see FIG. 7(b)). The resist 11 may be either of positive type or of negative type.

Next, a mask 12 having a pattern corresponding to arrangement of the preformatting pits 5 is placed on the layer of resist 11 in the closely contacted state and the thus built assembly is then subjected to exposure (see FIG. 7(c)).

Next, the resist 11 which has been exposed to a light beam is developed (see FIG. 7(d)). Thus, transference of the preformatting pit pattern onto the resist 11 is achieved, whereby a plurality of holes are formed on the resist 11 at the position where the preformatting pits 5 are to be located. No resist is exists in each of the holes because it is removed therefrom during the step of developing. Thus, the upper surface of the optical reflective film 3 is exposed to the outside at the bottom of each of the holes while the residual part of the resist 11 is kept still placed on the optical reflective film 3 to cover the surface of the latter therewith (see FIG. 7(d)).

Next, the exposed parts on the optical reflective film 3 are subjected to etching in the presence of etching liquid which is filled in each of the holes on the resist 11. This leads to a result that the part of the optical reflective film 3 which is not covered with the resist 11 is removed until the inside surface of the front base plate 2 is exposed to the outside and the other part of the optical reflective film 3 which is covered with the resist 11 remains together with the resist 11 while it is adhesively secured to the inside surface of the front base plate 2 (see FIG. 7(e)).

Next, the resist 11 is removed (see FIG. 7(f)). Now, production of the optical recording medium 1 has been completed by way of the above-described steps.

As required, an optical recording film 4 is placed on the optical reflective film 3 (see FIG. 7(g)).

EXAMPLE

First, an aluminum film having a thickness in the range of 800 to 1200Å was formed over the inside surface of a front base plate made of polycarbonate resin by vaccum depositing.

Next, the thus formed aluminum film was coated with resist manufactured (and sold under the tradename Microposit-S-1400-17) by Shipley Co., Ltd. by spin coating under the operative condition of 3,000 rpm until the resist film had a thickness of 0.5 to 0.7 micron. Thereafter, the resist film was dried by heating at a temperature of 90° C. for about 20 minutes.

Next, a mask having a pattern corresponding to arrangement of a plurality of preformatting pits was placed on the resist film in the closely contacted state and it was then subjected to exposure to beam at an optical density of 4 mJ/cm$^2$.

After the assembly was immersed for about 20 seconds in a solution which was prepared by diluting developing liquied MF 312 of Shipley Co., Ltd. with twice water, it was wiped free from water and it is then dried.

Next, the assembly was immersed in phosphoric acid-nitric acid based etching liquid at a temperature of 40° C. for 1 minute to etch the aluminum film. Thereafter, it was washed with water, it was then wiped free from water and finally it was dried.

Next, the assembly was immersed in peeling liquid (No. 10) manufactured by Tokyo Oka Kogyo Co., Ltd. for 2 seconds to remove the resist. Thereafter, it was washed with water, it was then wiped free from water and finally it was dried.

Next, the assembly was covered with a layer of resin.

As a result, a properly preformatted optical recording medium was obtained by way of the steps as mentioned above.

Figure 8:
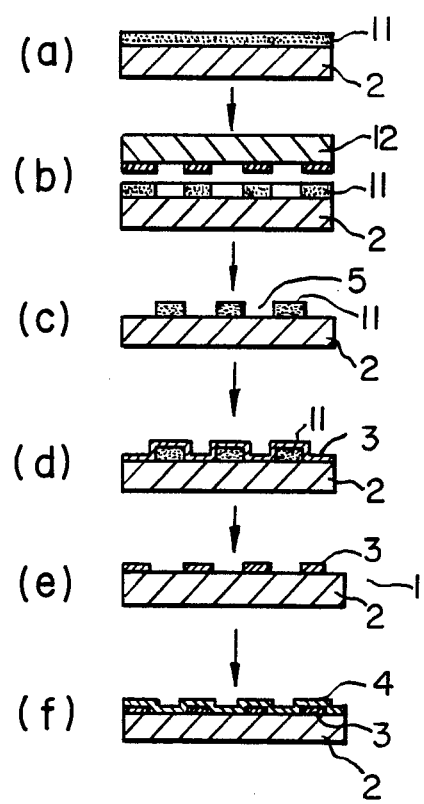
FIG. 8 is another illustrative view showing the steps of producing an optical recording medium.
Figure 9:
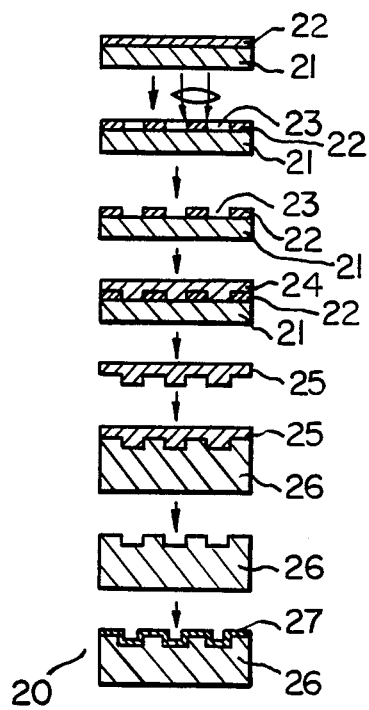
FIG. 9 is an illustrative view showing a conventional method of producing an optical recording medium.

FIG. 8 illustrates another embodiment of the method which is practiced in accordance with a so called resist lift-off process.

First, a layer of resist 11 is placed on the front base plate 2 of the optical recording card by spin coating (see FIG. 8(a)). The resist 11 may be either of positive type or negative type.

Next, a mask 12 having a pattern corresponding to arrangement of the preformatting pits 5 is placed on the resist 11 in the closedly contacted state and the thus built assembly is then subjected to exposing (see FIG. 8(b)).

Next, the resist 11 which has been subjected to exposing in that way is developed (see FIG. 8(c)). Thus, transference of the pit performatting pattern onto the resist 11 is achieved whereby a plurality of holes are formed on the resist 11 at the position where the pits are to be located. No resist 11 exists in each of the holes because it is removed therefrom during the step of developing. Thus, the inside surface of the front base plate 2 is exposed to the outside while the residual part of the same is covered with the resist 11 (see FIG. 8(c)).

Next, an optical reflective film 3 constituted by metallic coating is formed on the resist 11 by plating or depositing (see FIG. 8(d)).

Next, the resist 11 is removed in accordance with the resist lift-off process. After completion of removal of the resist only the optical reflective film 3 having a pattern corresponding to the arrangement of the preformatting pits 5 remains on the base plate 2 (see FIG. 8(e)). Now, production of the optical recording medium 1 has been completed by way of the above-described manner.

As required, an optical covering film 4 comprising an optical recording film is placed on the optical reflective material 3 (see FIG. 8(f)).

When the optical recording medium or the optical recording card 10 as constructed in the above-described manner is practically used, as shown in FIG. 1, reading light is emitted toward the outside surface of the front base plate 2 of the optical recording card 10 and reflected light is then read. At this moment some of the preformatting pits 5 can be read in dependency on the difference in reflection which is caused by existence and absence of the optical reflective film 3 or the difference in reflection between the thin film 3 and the optical recording film 4.

Since the optical recording medium 1 of the optical recording card 10 of the invention can be produced in accordance with the photographic etching technique, it is assured that optical cards can be produced and prepared at an inexpensive cost within a short period of time. Other advantageous features of the invention are that a large number of optical cards can be produced at a high productivity on the basis of mass production and moreover a manufacturer can adapt himself to any order in the type of multi-kind and small production lot.

While the present invention has been described above with respect to a few preferred embodiments thereof, it should of course be understood that it should not be limited only to them but various changes or modifications may be made in any acceptable manner without departure from the spirit and scope of the invention as defined by the appended claims.

What is claimed is:

1. A preformatted optical recording card comprising
    a transparent front base plate and a rear base plate adhesively secured to each other,
    an optical reflective film having an arrangement of preformatting pits formed within the reflective film, the reflective film with the pits being disposed on an inside surface of said transparent front base plate,
    an optical recording film disposed within said pits and on said reflective film, and wherein
    said preformatting pits are formed by photo-etching.

2. A method of producing a preformatted optical recording card having a front base plate to be adhesively secured to a rear base plate, comprising the steps of:
    forming an optical reflective film on a surface of a transparent front base plate,
    forming a layer of resist on said optical reflective film,
    exposing said layer of resist to a light beam which passes through a mask having a pattern corresponding to an arrangement of a plurality of preformatting pits,
    developing the layer of resist to produce a plurality of pits in the optical reflective film by etching in accordance with said pattern, etching of the reflective film producing a plurality of pits in accordance with said pattern, removing the residual resist, and depositing an optical recording film within said pits and on said reflective film.

3. A method as defined in claim 2, further comprising the step of adhesively securing said front base plate to a rear base plate with said optical reflective film between said plates, said rear base plate providing strength to hold the shape of the card.

4. A method of producing a preformatted optical recording card having a front base plate to be adhesively secured to a rear base plate, comprising of steps of forming a layer of resist on a surface of a transparent front base plate, exposing said layer of resist to a light beam which passes through a mask having a pattern corresponding to an arrangement of a plurality of preformatting pits, developing the layer of resist to produce a plurality of holes by etching in accordance with said pattern corresponding to the arrangement of the preformatting pits, forming an optical reflective film on the layer of resist and on exposed portions of said surface on the front base plate, removing the residual resist in accordance with a resist lift-off process to produce an array of pits in the reflective film, and depositing an optical recording film within said pits and on said reflective film.

5. A method as defined in claim 4, further comprising the step of adhesively securing said front base plate to a rear base plate with said optical reflective film between said plates, said rear base plate providing strength to hold the shape of the card.

* * * * *